3,381,037
PROCESS FOR PRODUCING ACETALDEHYDE
Tsutomu Ohmae, Osaka, Keizo Matsushiro, Ashiya-shi, and Hiroshi Yamamoto, Nishinomiya-shi, Japan, assignors to Nippon Gosei Kagaku Kogyo Kabushiki Kaisha, Osaka, Japan, a corporation of Japan
No Drawing. Continuation-in-part of application Ser. No. 240,129, Nov. 26, 1962. This application Jan. 14, 1966, Ser. No. 520,643
Claims priority, application Japan, Feb. 26, 1962, 37/6,600
5 Claims. (Cl. 260—604)

This is a continuation-in-part of application Ser. No. 240,129 filed Nov. 26, 1962, now abandoned.

The invention relates to a process for producing acetaldehyde, more particularly a process for producing acetaldehyde by reacting ethylene with oxygen and an aliphatic alcohol having carbon atoms up to 4 in the presence of a catalyst.

Acetaldehyde is a well-known intermediate in the preparation of various useful organic compounds, and it is hitherto produced commercially by hydrating acetylene.

Recently, however, it was found by Dr. J. Smidt to be able to prepare acetaldehyde by contacting ethylene, oxygen and an aqueous solution containing catalyst. In such process, water is used as not only reaction medium but also one of the starting materials for the reaction. The use of large amount of water is necessary to proceed the reaction, whereas only small amounts of water-miscible organic solvents may be used to increase the solubility of the gases to the aqueous solution.

Unexpectedly, we have discovered that acetaldehyde may be also prepared with desirably increased reaction rate by contacting ethylene, oxygen and an alcoholic solution containing a catalyst as described hereinafter. The process can be clearly distinguished from the prior process as described above in point of employing substantially anhydrous lower aliphatic alcohols.

An object of the present invention is to provide a new process for producing acetaldehyde.

A particular object of the present invention is to provide a process for producing acetaldehyde from ethylene with increased reaction rate.

Said objects may be attained according to the process of the present invention by reacting ethylene, oxygen and an aliphatic alcohol having carbon atoms up to 4 under the conditions described hereinafter and recovering acetaldehyde from the reaction mixture.

The precise mechanism by which the alcohols are preferably employed for the reaction is not fully understood. It is, however, suggested that the reaction carried out in the present invention may be represented by the following equations, because there may be found the formation of acetaldehyde-dialkylacetal and water with acetaldehyde in the reaction mixture:

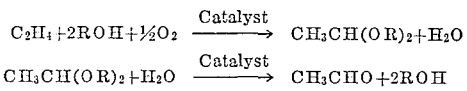

Said acetal and water contained in the reaction mixture may furthermore convert into acetaldehyde according to the latter equation described above during distillation of the reaction mixture.

The preferred examples of the aliphatic alcohols employed in the present invention are methanol, ethanol, normal propanol, isopropanol, normal butanol, isobutanol, secondary butanol and tertiary butanol. They are preferably employed in substantially anhydrous form. The catalyst employed in the present invention consists of a palladium salt and at least one of salts of metals selected from the group consisting of copper and iron. The salts may be preferably halides such as chloride and bromide or carboxylates such as acetate, propionate and butyrate. Oxygen may be employed either in pure state or in diluted state such as air. The reaction may be preferably carried out at a temperature of from about 50° C. to 150° C., desirably from 60° C. to 100° C., and under super-atmospheric pressure up to about 100 atmospheres, desirably from 10 to 50 atmospheres. The feed ratio of ethylene and oxygen may be theoretically 2:1 by mole, but from the point of practical view the use of the large excess of ethylene is preferred to avoid any explosive accident. The catalyst may be preferably used in the ratio of less than about 0.005 mole of a palladium salt and less than about 0.2 mole of a copper or iron salt or mixture thereof to 1 mole of an alcohol.

In carrying out the process of the present invention, a substantially anhydrous alcohol and the catalyst are charged and then ethylene and oxygen are introduced into a reaction zone wherein acetaldehyde is produced. If necessary, they are occasionally or continuously charged. In another case, a gaseous mixture of ethylene, oxygen and vaporized alcohol is passed over the catalyst supported on a suitable carrier. Acetaldehyde may be recovered from the reaction mixture by means of flash distillation or fractionation.

According to the present invention, acetaldehyde may be produced from ethylene with commercial advantages obtained by the further increased reaction rate and more weak corrosion properties of the reaction mixture to employed reaction vessel, pipes, valves, etc., compared with that in the previous process described above carried out in an aqueous system.

The present invention is illustrated in detail by the following examples. In each example, an autoclave of one litre capacity, which was lined with titanium metal and was provided with an electromagnetic stirrer, was employed as a reactor.

EXAMPLE 1

Into the autoclave, 250 g. of absolute ethanol, 1.5 g. of palladium chloride and 33.6 g. of cupric chloride were charged, and were heated with agitation to maintain at a temperature of about 80° C. during reaction for about 4 hours. Ethylene and oxygen were introduced in molar ratio of 6 to 1 into said autoclave up to about 45 atms., and they were additionally charged at every time when the fall of about 10 atms. in pressure was resulted. After the reaction was completed, it was shown by means of chemical analysis that the resulting mixture contained 60.1 g. of acetaldehyde and 93.9 g. of diethylacetal thereof. In practice, however, 88.7 g. of the former and 16.9 g. of the latter were recovered by distillation of the mixture.

On the other hand, in the control prepared in the same way as described above except that 250 g. of water was used in place of ethanol, the yield of acetaldehyde was 26.0 g.

EXAMPLE 2

The procedure of Example 1 was repeated with the exception that 0.75 g. of palladium chloride, 16.8 g. of cupric chloride and 25.0 g. of cupric acetate monohydrate were employed as catalyst and the reaction was carried out under a pressure of about 10 atms. for 12 hours and 40 minutes. After the reaction was complete, the resulting mixture was distilled and 74.5 g. of acetaldehyde was obtained.

In the control prepared in the same way as described above except that 250 g. of water was employed in place of ethanol, the yield of acetaldehyde was 21.5 g.

EXAMPLES 3 TO 4

In each case, the procedure of Example 1 was repeated with the exception that anhydrous methanol or anhydrous tertiary butanol was employed in place of ethanol. Results are shown in the following Table I.

TABLE I

| Example No. | 3 | 4 |
|---|---|---|
| Methanol (g.) | 250 | |
| Tertiary Butanol (g.) | | 250 |
| Reaction Time | 4 hrs | 3 hrs. and 40 min. |
| Products: | | |
| Acetaldehyde (g.) | 100.3 | 52.5 |
| Acetal (g.) | 10.1 | |

EXAMPLES 5 TO 6

In each case, the procedure of Example 1 was repeated with the exception that ferric chloride or ferric chloride and cupric chloride in place of cupric chloride alone. Results are shown in the following Table II.

TABLE II

| Example No. | 5 | 6 |
|---|---|---|
| Ferric chloride (g.) | 40.5 | 10.0 |
| Cupric chloride (g.) | | 25.5 |
| Products: | | |
| Acetaldehyde (g.) | 40.5 | 110.8 |
| Acetal (g.) | 7.2 | 21.6 |

What we claim is:

1. A process for producing acetaldehyde which comprises reacting at least 2 moles of ethylene with at least 1 mole of oxygen and at least 4 moles of a substantially anhydrous alkanol having less than 5 carbon atoms in the presence of a catalyst consisting of a palladium salt and at least one salt of a metal selected from the group consisting of copper and iron, said salts being selected from the group consisting of halides and alkanoates having from 2 through 4 carbon atoms and said catalyst being in a ratio of less than 0.005 mole of said palladium salt and less than 0.2 mole of said metal salt per mole of alkanol and recovering acetaldehyde produced in the reaction mixture by distillation.

2. A process as claimed in claim 1, wherein the alcohol is methanol.

3. A process as claimed in claim 1, wherein the alcohol is ethanol.

4. A process as claimed in claim 1, wherein the catalyst consists of palladium chloride and cupric chloride.

5. A process as claimed in claim 1, wherein the reaction is carried out at a temperature of from 50° C. to 150° C. and a superatmospheric pressure up to 100 atmospheres.

References Cited

UNITED STATES PATENTS 3,076,032  1/1963  Riemenschneider et al. 260—604

LEON ZITVER, *Primary Examiner.*

R. H. LILES, *Assistant Examiner.*